Feb. 11, 1969    F. A. TURESKIS    3,426,954

HAND TOOL

Filed Aug. 3, 1966

INVENTOR
FRANK A. TURESKIS

BY John F. Dunn

ATTORNEY

United States Patent Office 3,426,954
Patented Feb. 11, 1969

3,426,954
HAND TOOL
Frank A. Tureskis, 1236 N. Milton St., Lot 47,
Springfield, Ill. 62702
Filed Aug. 3, 1966, Ser. No. 575,916
U.S. Cl. 228—51
Int. Cl. B23k 37/04; B23p 19/04; B25b 27/00
6 Claims

ABSTRACT OF THE DISCLOSURE

This invention is a hand tool for gripping an object in a pair of jaws with one hand and with the same hand exerting a controlled force against the object away from the jaws independently of the force used to close the jaws on the object.

---

This invention relates to hand tools and particularly to hand tools which are designed for operation with one hand. More particularly this invention relates to a hand tool of simple and inexpensive design which is advantageous in the removal of electrical components from printed electric circuitboards.

There have been numerous significant developments in the electronics industry in recent years which have been the basis for many new products and methods in the areas of research, defense, aviation, space development, business machines, consumer goods and the like. Significant among these developments have been the transistor and the printed electrical circuitboard. These two developments have paved the way for miniaturization and made possible size reduction and compactness which today are so much a part of our lives and so important in our space program.

This trend has not been problem-free, however. It is common knowledge that the accepted method for installing and removing electrical components requires use of a soldering iron or gun as a heat source, a long nosed pliers to grip the electrical component or its lead wires, and solder. Finding sufficient work area for all these items has always been difficult enough, but with the advent of miniaturization the problem has reached even more serious proportions. It is particularly difficult to remove components from printed electric circuitboards with present day tools and equipment.

In confined areas two problems arise with the use of conventional tools for printed circuitboard work. First the worker finds it difficult to see the joint to be severed because his hand often is in his line-of-sight and secondly there is a tendency either to overheat the joint or jerk the component out while the joint is still cold. In either event damage to the component or the circuitboard or both is likely.

Furthermore, with the soldering gun in one hand and a long nosed pliers in the other a worker still is at a disadvantage because he needs some clamping means to hold the circuitboard while he works. Clamps are not always convenient, particularly in custom work.

An object of this invention is a hand tool for use in the removal of electrical components from printed electric circuitboards. Another object of this invention is a hand tool of simple and inexpensive design for use with one hand. Still a further object of this invention is a hand tool which can be operated with one hand both to grip an electrical component and to apply steady pressure to an electric circuitboard to which the component is attached. Other objects of this invention will be apparent from the detailed description thereof.

Broadly speaking the hand tool of this invention has a pair of elongated jaws with means to open and close said jaws with one hand. Also the hand tool of this invention includes digital means slideably attached to one of said jaws to assert a force substantially in the direction of elongation of said jaws by pushing at the other end thereof.

In one embodiment of the invention a pair of elongated jaws are pivotally attached to a pistol-grip handle having a lever arm spaced apart therefrom which can be squeezed and released to open and close said jaws. A slender elongated rod is slideably mounted in one of said jaws in such fashion that it can be pushed with the operator's thumb to extend beyond said jaws and can be withdrawn from its extended position by suitable means such as a spring. Thus when an electrical component is to be removed from a printed electric circuit board the jaws can be closed upon the joint to be severed, or one or more of the lead wires, and the slender rod can be pushed with the operator's thumb to apply force against the circuitboard. The amount of force is controlled by the operator's thumb and a steady pressure can be maintained. As the joint melts, the steady pressure is maintained with the operator's thumb to push the board from the component without damage to either the component or the circuitboard.

Thus it can be seen that the tool of applicant is advantageous, particularly because of its pistol-type design which keeps the operator's line of sight unobstructed. Moreover the hand tool of this invention is advantageous because it permits the operator with one hand to perform both the function of gripping the joint to be severed and applying pressure against the joint, leaving the other hand free to hold the soldering iron or gun. There is no need to put the electrical apparatus in a vise or otherwise clamp it into a fixed position. With the device of applicant the job of removing electrical components from printed electrical circuitboards need no longer be awkward or tedious, and it advantageously safeguards the electrical component or the circuitboard.

Figure 1:
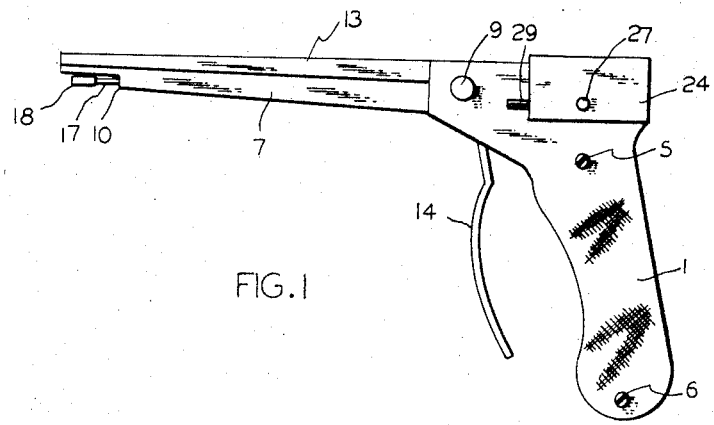
FIGURE 1 illustrates in plan view one embodiment of the present invention.
Figure 2:
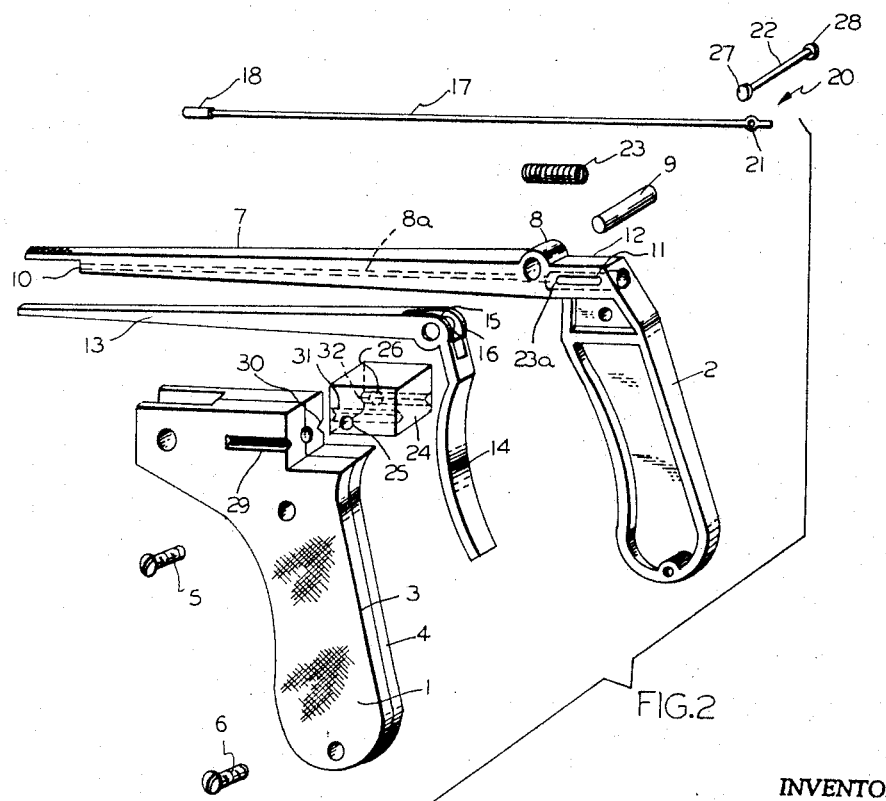
FIGURE 2 illustrates in exploded view the embodiment of FIGURE 1.

Referring now to the drawings for purposes of illustration, the embodiment of FIGURE 1 and FIGURE 2 has pistol-grip handle 1. Handle 1 is composed of metal frame 2 and plastic side components 3 and 4 attached to handle 1 by means of screws 5 and 6. Handle 1 and one or more of the components 2, 3, or 4 can be fabricated of plastic, metal, or other composition or material adequate to give the necessary strength. Where economical handle 1 can be made integral with lower jaw 7.

Lower jaw 7 is fixably attached to frame 2. Jaw 7 has incorporated therein cylindrical bearing surface 8, and elongated hollow cylindrical housing 8a which extends from recessed shoulder 10 to the slotted opening 11 in rod guide 12. Upper jaw 13 has curved handle 14 attached thereto at spaced apart openings 15 and 16. When upper jaw 13 is placed in position over lower jaw 7 spaced apart openings 15 and 16 mesh with cylindrical surface 8 so that pin 9 can be inserted therethrough. Pin 9 is advantageously built to include a screw to tighten and loosen the fit of spaced apart openings 15 and 16 with bearing surface 8. In this manner the amount of force required to open and close said jaws can be adjusted to suit the particular needs or desires of the operator.

Elongated rod 17 having at one end thereof rubber tip 18 is inserted in housing 8a in lower jaw 7 and extends into rod guide 11 and is of such a length that when rubber tip 18 is withdrawn into position against shoulder 10 the other end of rod 17 is at end of rod guide 11. End 20 of rod 17 contains opening 21 through which pin 22 is inserted. Pin 22 is slideably mounted in rod guide 11 and adapted to travel back and forth therein. Thus when rod 17 is moved back and forth pin 22 and rod guide 11 cooperate to prevent movement of the rod in a vertical direction. Spring 23 is positioned on rod 17 between end 23a of rod guide 12 and pin 22 so that as rod 17 is extended spring 23 is compressed and upon release spring 23 will return rod 17 to its normally withdrawn position.

Depressor 24 has opening 25 on one side thereof and a similar opening on the opposite side thereof at 26 and is positioned so that pin 22, which terminates in flat heads 27 and 28, passes therethrough and thus connects depressor 24 to rod 17. V grooves 29 and 30 on handle 1 each have a slot therein to serve as a track for travel of pin 22. Ridges 31 and 32 on the inside of depressor 24 slide along grooves 29 and 30. This prevents unwanted motion of rod 17 as it slides back and forth.

Thus when lever arm 14 is squeezed or released jaws 7 and 13 will open and close. Likewise when depressor 24 is pushed rod 17 is extended and when depressor 24 is released spring 23 returns rod 17 to its normally withdrawn position.

The device of the present invention has many obvious applications and advantages for use in the fabrication and repair of radar, space, and avionic equipment as well as applications in the repair of more conventional equipment such as volt meters. Because modern day electrical systems are particularly sensitive to heat and can be severely damaged by undue exposure thereto it is particularly important to note that the device of applicant when fabricated of suitable heat conducting material acts as a heat sink for the removal of excess and unwanted heat.

When electrical components are attached to electric circuitboards it is often important to draw them down tightly to the circuitboard at the time they are soldered. The device of applicant is particularly suited for this application because it permits the operator to grip the lead wire on the component after the wire has been extended through the circuitboard and by means of the depressor to exert force against the circuitboard to draw the component down tightly into position.

In a further embodiment of the invention of applicant the tip of lower jaw 7 is fabricated to provide a concentrated heat source at the tip by means of electrical wiring extending through lower jaw 7 down into handle 1 to an electrical supply source such as a battery or by means of a cord and plug to a convenient electrical outlet. The electrical wiring required in this application is of the type commonly known in the art and particularly adapted and suited for the construction of soldering irons and soldering guns. In this advantageous embodiment the tool of applicant becomes even more versatile. It permits the operator to grip a joint to be soldered by means of jaws 7 and 13, to apply heat to the joint by means of the heat source at tip 29 on lower jaw 7, and by use of rod 17 the component to be soldered can be drawn tightly to the circuit board or other element to which it is to be soldered, and each of these operations can be formed simultaneously by the use of only one hand.

From the forgoing description and illustrations of the present invention modifications and variations thereof will become apparent to the skilled artisan. For example, rubber tip 18 on rod 17 can be replaced by a burnishing tool or file which can be extended to clean electrical contacts in hard to reach places. The tip of rod 17 can be magnetized to hold small components in position or to pick them up when dropped in hard to reach places, or rod 17 may be employed as a punch. The tool may be equipped with a light, the beam of which is focused on the tip of jaws 7 and 13 to light the work area, and of course, as is commonly found in ordinary pliers, wire cutters may be built into the apparatus.

Thus it will be apparent that the invention is not limited to the structure and exact method described above but shall also include other structures and combinations falling within the broad scope and spirit of the invention and the claims which follow.

What is claimed is:

1. A hand tool for removing electrical components which tool is capable of being operated with one hand comprising a pair of pivoted jaws adapted to be opened and closed with one hand, and digital means mounted slideably on at least one of said jaws to transmit a digitally controlled force away from said jaws whereby said jaws and said digital means are operated independently of each other with one hand to exert a force against objects gripped in said jaws.

2. The hand tool of claim 1 in which said jaws are elongated.

3. The hand tool of claim 2 in which said digital means is adapted to transmit a force away from said jaws substantially in the direction of elongation.

4. The hand tool of claim 3 in which one of said jaws includes a handle affixed thereto and the other of said jaws includes a lever arm spaced apart from said handle whereby when said handle and lever are squeezed said jaws close and when they are forced apart said jaws open.

5. The hand tool of claim 4 in which said digital means is a slender rod slideably mounted in one of said jaws and positioned to move substantially in the direction of elongation of said jaw to extend beyond said jaw when pushed from the opposed end of said jaw adjacent said handle.

6. The hand tool of claim 5 in which said digital means includes spring means to return said slender rod from its extended position and to maintain it in a normally withdrawn position.

References Cited

UNITED STATES PATENTS

| 2,469,877 | 5/1949 | Haberman | 228—51 |
| 2,722,857 | 11/1955 | Lacey | 29—268 |
| 1,810,315 | 6/1931 | Kaser | 29—268 |

RICHARD H. EANES, JR., *Primary Examiner.*

U.S. Cl. X.R.

29—268, 278